United States Patent [19]

Christopher

[11] 4,257,067
[45] Mar. 17, 1981

[54] SOUND ENHANCEMENT SYSTEM FOR TELEVISION RECEIVERS

[76] Inventor: James S. Christopher, P.O. Box 102, San Bernardino, Calif. 92402

[21] Appl. No.: 61,523

[22] Filed: Jul. 27, 1979

[51] Int. Cl.³ .......................... H04N 5/44; H04N 5/60
[52] U.S. Cl. .................................. 358/189; 358/194.1; 358/198
[58] Field of Search ............... 358/198, 188, 189, 194; 455/149, 355; 179/1 G, 1 GA, 1 GB

[56] References Cited
PUBLICATIONS

Allied Electronics Catalog No. 290, 1970, p. 74.
Lafayette Radio Electronics Catalog, No. 720, 1972, p. 187.

*Primary Examiner*—John C. Martin
*Attorney, Agent, or Firm*—John H. Crowe; Fred N. Schwend

[57] ABSTRACT

A conventional sound reproducing device, such as an am/fm stereo radio receiver, including additional speakers and a volume control device, is connected in circuit with the input of a conventional television receiver to enhance the sound reproduced by the television receiver. An impedance element is selectively switchable in and out of the circuit to change the sound level of the speakers of the radio receiver relative to the sound level of the television speaker or to disconnect the radio receiver. Additional impedance elements are switchable in and out of circuit with the volume control device of the television receiver by switch means located in proximity to a person seated before the television receiver whereby to adjust the sound level of the entire system.

8 Claims, 2 Drawing Figures

SOUND ENHANCEMENT SYSTEM FOR TELEVISION RECEIVERS

BACKGROUND OF THE INVENTION

1. Field of the Invention

This invention relates to television receivers and has particular reference to a means for improving the richness, volume and other characteristics of sounds reproduced by the television receiver.

2. Description of the Prior Art

Although conventional television receivers have generally satisfactory sound reproducing systems, the main emphasis is usually put on the quality of the video system. The television sound system is generally monaural and its single speaker is usually located in the receiver, directly adjacent the picture tube. Also, the television sound system is generally limited in volume or sound level to that which can be conveniently heard in a normal sized room. Normally, even high quality television receivers have an audio output of only three to five watts of power.

On the other hand, high fidelity or stereo radio receivers usually have a considerably greater sound level output capability than television sound reproducing systems and are also generally capable of reproducing better quality sound, particularly in the lower frequency ranges. That is, am/fm stereo radio receivers generally have an output of 15 watts or more.

When stereophonic sounds are reproduced by stereo sound reproducing systems they are particularly pleasing since the element of three-dimensional sound projection is present, due to both the physical spacing of two or more speakers relative to the listener and to the projection of stereophonically related sounds from the different speakers. However, even when monaural sounds are reproduced through physically spaced speakers they are much more pleasing and life-like than when emanating from a single source due to a pseudo-stereophonic effect. Also, multiple speakers are capable of more faithfully reproducing low frequency sounds at higher sound levels than are single speakers. This is most noticeable when listening to certain sound effects of predominately low frequency, such as the crackling of a fire, the pounding of an ocean surf, the rumbling of an earthquake, etc., as well as certain musical programs.

It has been known heretofore to couple the speaker of a separate sound reproducing system to the speaker of a television receiver to provide additional volume. However, the additional sound system must be properly adjusted each time the television receiver is adjusted in order to provide a proper sound balance between the two. This becomes a nuisance when, for example, the viewer is interrupted to answer a telephone or to speak to someone else, requiring that he or she get up to individually turn off or at least turn down the television sound system and the separate sound system and later again individually adjust the systems. Also, quite often, television commercials are broadcast at higher sound levels than the remainder of the associated main programs and, therefore, if the sound volume of the various speakers is set to provide the best listening pleasure for the main portion of the program, it would be too loud and possibly unbearable when commercials are broadcast, thus requiring independent adjustment of the sound systems during such commercial broadcasts. Additionally, it may be desired to project certain portions of a television program at a higher sound level than others to obtain better or more pleasing effects.

SUMMARY OF THE INVENTION

A principal object of the present invention is to provide a simple and inexpensive system for enhancing the quality of sound reproduced by a conventional television receiver.

Another object is to provide a sound enhancement system for television receivers which may utilize conventional sound reproducing apparatus commonly found in a home, such as a radio, stereophonic sound reproducing system, etc.

Another object is to provide a system of the above type which enables a person viewing a television program to readily change the relative sound levels of the television receiver and the additional sound reproducing system while also enabling him to readily change the volume of the entire system as a whole.

A further object is to enable a person viewing a television program to remotely control the level of sounds produced conjointly by television receiver and any additional interconnected sound reproducing system.

According to the present invention, a sound quality enhancement system and controls are provided which may be readily connected to the audio channels of a conventional television receiver and other conventional sound reproducing device, such as a radio, permitting the additional device to reinforce the sound emanating from the television receiver and to enhance its quality. Such controls enable a person viewing a television program to readily vary the sound level of the television receiver relative to the sound level of the additional sound system or systems coupled to the receiver and thus blend the sounds as desired. The controls also enable the viewer to remotely control the overall volume of sounds produced by both the television receiver and the additional sound system by a single control device.

BRIEF DESCRIPTION OF THE DRAWINGS

The manner in which the above and other objects of the invention are accomplished will be readily understood on reference to the following specification when read in conjunction with the accompanying drawing, wherein.

DESCRIPTION OF THE PREFERRED EMBODIMENT

Figure 1:
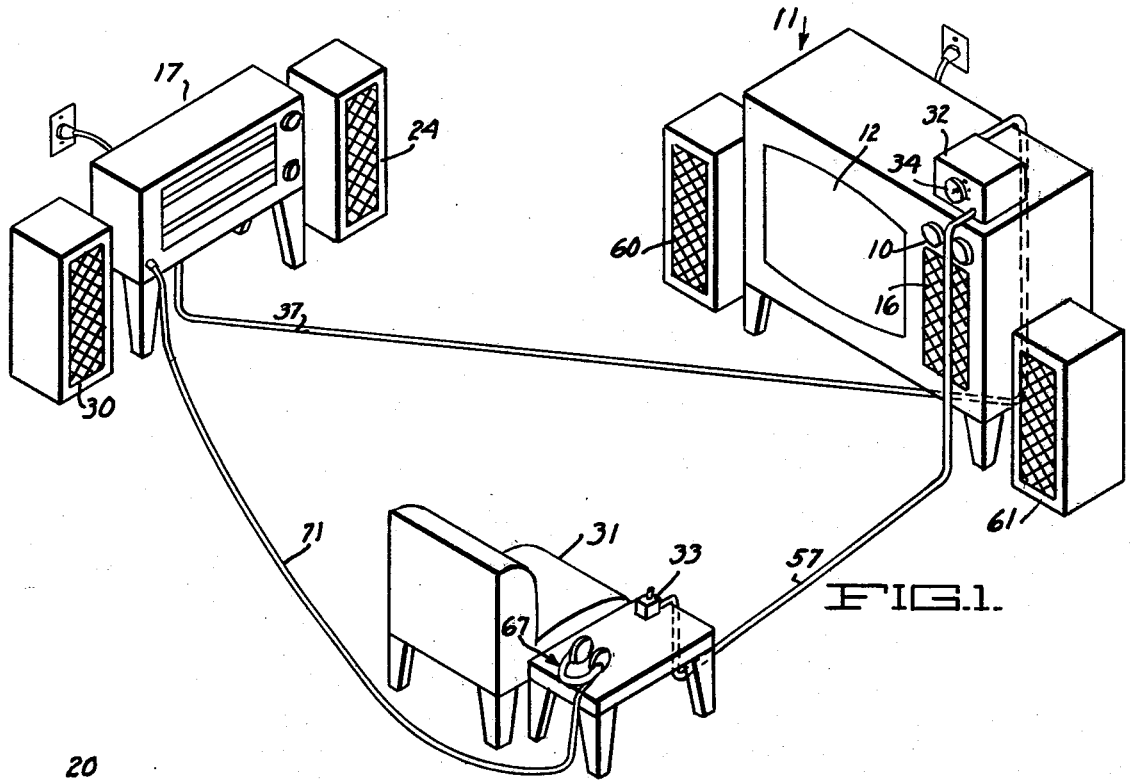
FIG. 1 is a perspective view of a conventional television receiver and an interconnected auxiliary sound reproducing system, including a control system therefor, embodying a preferred form of the present invention.

While this invention is susceptible to embodiment in many different forms, there is shown in the drawing and will be described in detail, one specific embodiment, with the understanding that the present disclosure is to be considered as an exemplification of the principles of the invention and is not intended to limit the invention to the embodiment illustrated. The scope of the invention will be pointed out in the appended claims.

Referring to the drawing, a conventional television receiver 11 is provided having a cathode ray tube 12 on which video signals are projected. Television signals received by a suitable antenna 19 are applied to a processing circuit 13 which separates the video signals and the audio signals and applies the audio signals through a suitable audio channel including a volume control potentiometer 14, a final amplifier 15 and a speaker 16. The potentiometer 14 is controlled by an adjustable knob 10 accessible from the exterior of the receiver.

An auxiliary sound reproducing system shown typically as an am/fm stereo radio receiver 17 is provided having separate audio channels for normally processing right and left stereophonic sound trains, both channels being located in a single cabinet. One of the audio channels includes a sound reproducing circuit 20 whose output is connected through a lead 21 and a volume control potentiometer 22 to a final amplifier 23. The output of amplifier 23 is connected through a removable plug connector or jack 65 to a speaker 24. Likewise, the second audio channel comprises a sound reproducing circuit 25 whose outlet is connected through a lead 26 and a volume control potentiometer 27 to a final amplifier 28. The output of the latter is connected through a removable plug connector or jack 66 to a speaker 30 physically spaced some distance from speaker 24 and from the television speaker 16 as well as from a viewing station where a viewer may, for example, be seated in a chair 31 facing the television receiver.

According to the present invention, a control circuit is provided to selectively couple the auxiliary radio receiver system 17 to the television audio system and to vary the sound level of the auxiliary speakers 24 and 30 relative to the sound level of the television speaker 16 without disturbing the individual volume adjustments of the audio channels of the system 17. Also, according to the present invention, the viewer, while seated in the chair 31, may remotely adjust the sound level of the entire sound reproducing system. For this purpose, two control units 32 and 33 are provided. The control unit 32, which may be located at any convenient location, includes a three position switch 34 having its movable contact blade 29 connected through a line 35 to the input of the television speaker 16 at 52. A first contact 36 of the switch 34 is connected by line 37 and removable plug connectors 38 and 40 to the inputs of the volume control potentiometers 22 and 27, respectively. A second contact 41 of switch 34 is connected through an impedance element, such as a resistor 42, to the line 37. An upper contact 39 of the switch 34 is a blank, representing an "off" condition of the switch.

The lines 35 and 37 are preferably shielded in a well known manner to prevent pick-up of stray electro-magnetic interference, or the like.

The control unit 33, which is preferably located directly adjacent the television viewer's location, comprises a three position toggle switch 43 having its movable contact blade connected by a flexible line 44 and removable plug or jack connector 45 in the unit 32 to a line 49 which is connected at 46 to the input of the television receiver volume control potentiometer 14.

One contact 47 of switch 43 is connected through a flexible line 48, plug jack connector 50 in unit 32, resistor 51 and line 69 to the grounded end 149 of the volume control potentiometer 14. A second contact 53 of switch 43 is connected through a flexible line 54, plug jack connector 55 and a second resistor 56, having an ohmic value greater than that of either of potentiometer 14 and resistor 51, to the line 69.

Lines 44, 48 and 54 are preferably encased in a flexible cable sheath 57, permitting the switch unit 33 to be moved about to different desired locations.

Figure 2:
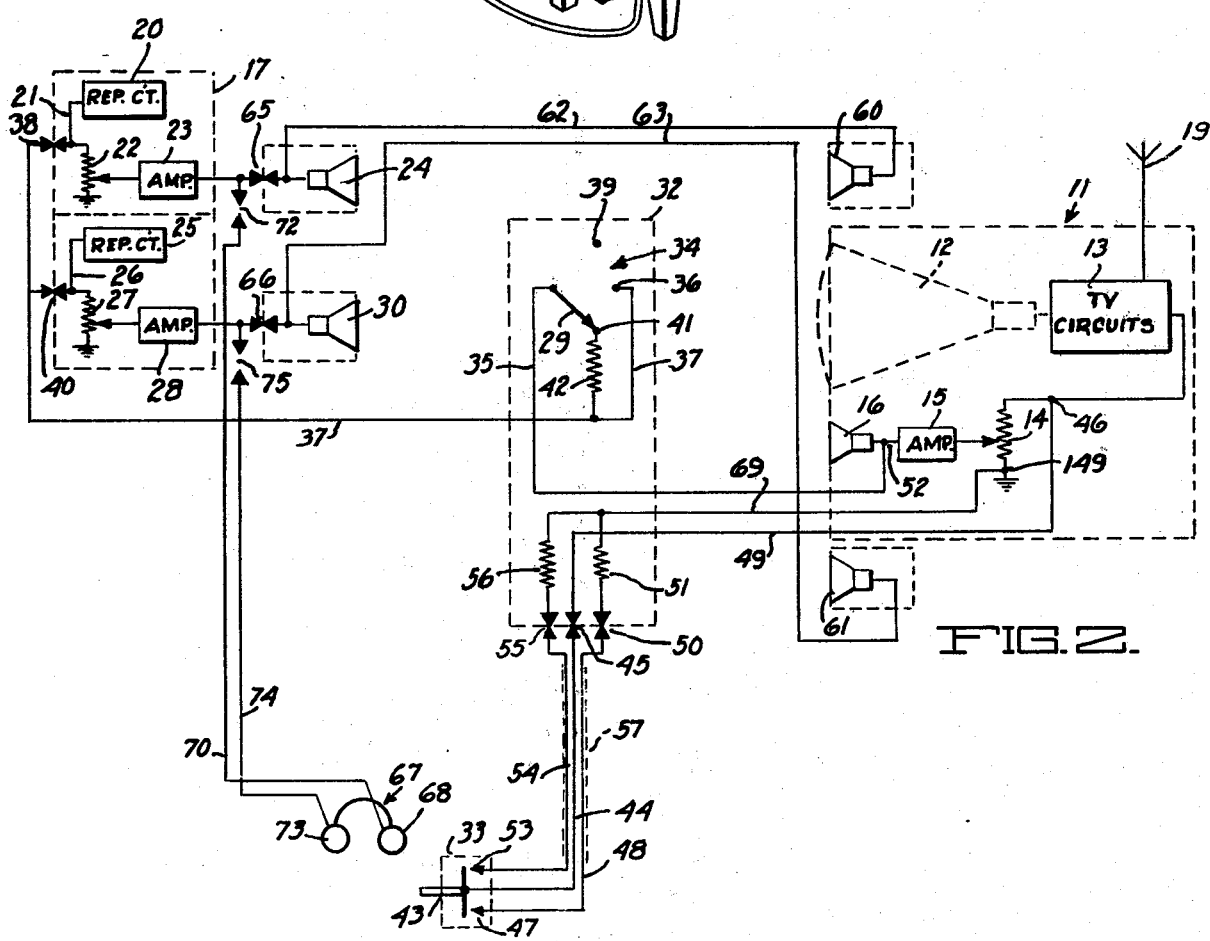
FIG. 2 is a schematic electrical diagram of the television receiver, the auxiliary sound reproducing system and the interconnecting control circuits therefor.

The system is preferably initially adjusted by setting switch 34 in its position shown in FIG. 2 and setting the switch 43 to disengage contacts 47 and 53, thereby disconnecting resistors 51 and 56 from parallel connection with potentiometer 14. The volume control potentiometers 14, 22 and 27 are then set to blend the sounds emanating from the speakers 16, 24 and 30 at desired levels for the best listening pleasure. Thereafter, if it is desired to reduce the overall sound level, while retaining the same balance of sound levels from the various speakers, the viewer need merely adjust the television volume control potentiometer 14.

On the other hand, if the viewer should be interrupted, as for example, by a telephone call, or if he does not wish to listen to a television commercial, he can throw the switch 43 to engage contact 53 to connect the resistor 56 so that the descrease in voltage across potentiometer 14 will substantially reduce the overall sound level to a point where he can carry on a conversation. If desired, the potentiometer 14 may be adjusted so that sounds emanating from the speaker 16 may be barely audible. Layer, by returning the switch 43 to its position disengaging contact 53, the overall sound level of the system will be returned to its previous value.

By throwing the switch 43 to engage contact 47, the resistor 51, having an ohmic value less than that of potentiometer 14 or of resistor 56, is connected in parallel with the potentiometer 14 to materially decrease the effective voltage across the potentiometer and thus substantially decrease the overall sound volume to an intermediate level.

If the viewer wishes to decrease the sound level of the television speaker 16 and at the same time increase the sound level of the speakers 24 and 30, the switch 34 is set to engage contact 36, thereby removing the resistor 42 from the input circuit to the auxiliary system. This results in additional current being drained from the speaker 16 to reduce the sound level thereof while increasing the sound level of the speakers 24 and 30. This imbalance of sound levels gives rise to pleasing sound effects when listening to certain television programs, such as those having dramatic background sound effects.

By setting the switch 34 to engage the switch blade 29 with the blank contact 39, the auxiliary system 17 will be disconnected and the television receiver will operate in a normal manner.

Additional speakers 60 and 61 may be connected through lines 62 and 63 to the inputs of speakers 24 and 30, respectively, to further enhance the sounds reproduced by the television receiver.

A monaural radio or a record reproducer having a single speaker physically displaced from the television receiver 11 may be substituted for the stereophonic reproducer 17 to obtain similar results. On the other hand, such monaural radio or record reproducer may be added to the system illustrated in FIGS. 1 and 2 to obtain even further enhancement of the reproduced sounds.

An important feature of the invention is that it enables a conventional high quality stereo headphone set, as indicated at 67, to be connected to the receiver 17 to enable a viewer to listen solely to sounds emanating from the stereo receiver 17 to the exclusion of sounds produced by the television receiver speaker 16. Further, such sounds transmitted by the headphone set 67 appear to have a pseudo-stereophonic effect, similar to that produced by the spaced speakers 24 and 30 when reproducing monaural sounds. For this purpose, one speaker 68 of the headphone set 67 may be connected through a line 70 of a flexible cable 71 and a removable plug jack 72 to the output of the amplifier 23 in one of the audio channels of receiver 17. Likewise, the other headphone speaker 73 of the headphone set may be connected through a line 74 of the cable 71 and a removable plug jack 75 to the output of the amplifier 28 in the other audio channel of the receiver 17.

The headphone set 67 may be connected to the receiver 17 either independently of or together with the speakers 24, 30, 60 and 61.

Accordingly, by setting the switch 34 to bypass the resistor 42 and by setting the switch 33 and/or the potentiometer 14 so that the volume of the television receiver speaker 16 is just slightly above the hearing threshold, the viewer may listen only to the higher quality and richer sounds emanating from headphone set 67 to the exclusion of sounds produced by the television speaker 16 and any other extraneous sounds or noises. By individually adjusting the potentiometers 22 and 27, the relative sound levels of the headphone speakers 68 and 73 may be varied as desired. Also, the viewer may thus listen to the sounds reproduced from the television receiver 11 through the receiver 17 without disturbing others located in the same area.

I claim:

1. A sound enhancement system for a television receiver having an audio channel including a speaker and an adjustable volume control device for said speaker comprising:
    sound reproducing means having a second audio channel including a second speaker located remotely from said first mentioned speaker;
    a second adjustable volume control device for said second speaker,
    a circuit for connecting the input of said first mentioned speaker to the input of said second volume control device,
    an impedance device, and
    switching means for selectively connecting said impedance device in and out of said circuit.

2. A sound enhancement system as defined in claim 1 wherein
    said switching means are selectively settable to disconnect said circuit.

3. A sound enhancement system as defined in claim 1 comprising:
    a second impedance device, and
    second switching means for selectively connecting said second impedance device in and out of circuit with said first mentioned volume control device.

4. A sound enhancement system as defined in claim 3 comprising:
    a third impedance device,
    said second switching means being effective to selectively connect either said second or said third impedance device in circuit with said first mentioned volume control device.

5. A sound enhancement system as defined in claims 1 or 3
    wherein said sound reproducing means comprises a stereophonic reproducing device having a third auto channel including a third speaker located remotely from said first mentioned and said second speaker,
    a third adjustable volume control device for said third speaker, said circuit being connected in parallel with the inputs of said second and third volume control devices.

6. A sound enhancement system as defined in claim 1 wherein
    said first mentioned volume control device comprises a potentiometer;
    a resistor,
    and switch means for selectively connecting said resistor in and out of parallel circuit connection with said potentiometer.

7. A sound enhancement system as defined in claim 1 wherein
    said first mentioned volume control device comprises a potentiometer;
    means forming a viewing station for said television receiver,
    said viewing station being located remotely from said speakers,
    a resistor, and
    second switching means for selectively connecting said resistor in and out of parallel circuit connection with said potentiometer,
    said second switching means being located adjacent said viewing station.

8. A sound enhancement system as defined in claim 1 wherein
    said first mentioned volume control device comprises a potentiometer;
    means forming a viewing station for said television receiver,
    said viewing station located remotely from said speakers,
    a pair of resistors of different ohmic values, and
    a three position switch means,
    said switch means being settable in one position to connect one of said resistors in parallel circuit connection with said potentiometer,
    said switch means being settable in a second position to connect the other of said resistors in parallel circuit connection with said potentiometer, and
    said switch means being settable in a third position to disconnect both of said resistors,
    said switch means being located adjacent said viewing station.

* * * * *